J. W. KERNS.
PISTON AND PISTON RING.
APPLICATION FILED MAR. 26, 1921.
1,416,472. Patented May 16, 1922.
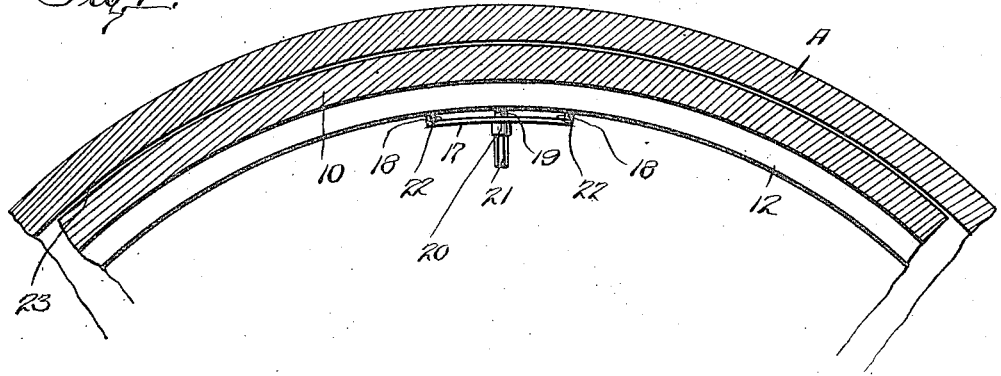
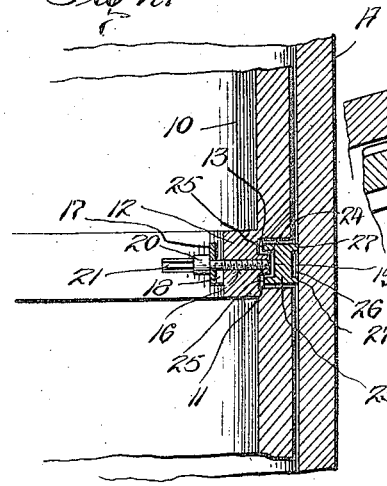
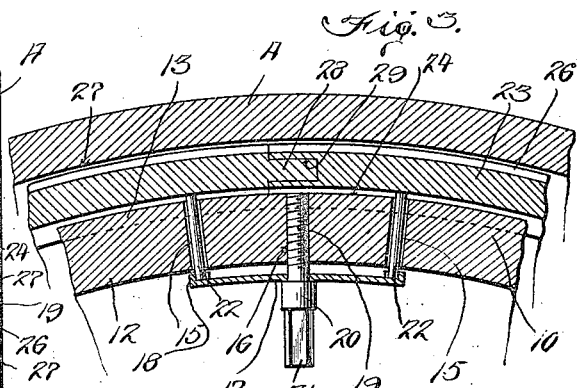
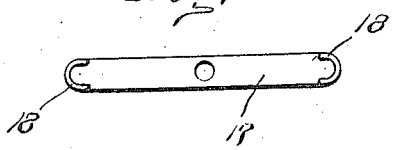
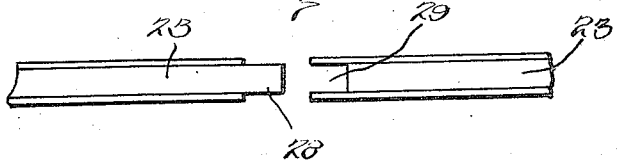
Inventor:
John W. Kerns
Watson E. Coleman
Attorney.

UNITED STATES PATENT OFFICE.

JOHN W. KERNS, OF LINCOLN, NEBRASKA.

PISTON AND PISTON RING.

1,416,472.  Specification of Letters Patent.  Patented May 16, 1922.

Application filed March 26, 1921. Serial No. 455,707.

*To all whom it may concern:*

Be it known that I, JOHN W. KERNS, a citizen of the United States, residing at Lincoln, in the county of Lancaster and State of Nebraska, have invented certain new and useful Improvements in Pistons and Piston Rings, of which the following is a specification, reference being had to the accompanying drawings.

This invention relates to pistons for internal combustion engines, and particularly to packing or piston rings thereof and the means whereby these piston rings may be resiliently urged outward against the wall of the cylinder.

The general object of my invention is to provide a packing for the pistons of internal combustion engines which is gas-tight but which operates with the least amount of friction possible, and particularly to provide means whereby the piston ring may be adjustably urged outward at one or a plurality of points and particularly at the abutting ends of the piston sections.

A further object is to provide springs disposed within the piston and having pins extending through the wall of the piston and engaging the piston ring, there being means for adjusting the tension of these springs on the pins to thereby adjust and equalize the outward pressure of the piston rings.

And a further object is to so construct the piston ring and the groove in which the piston ring is disposed as to prevent the passage of gas and gasoline or other explosive liquid past the piston ring, thus preventing the lubricating oil from passing up into the combustion chamber and becoming carbonized and preventing leakage of compression.

Other objects will appear in the course of the following description.

My invention is illustrated in the accompanying drawings, wherein:—

Figure 1 is a fragmentary transverse sectional view of a portion of a cylinder and piston with my improved piston ring applied thereto;

Figure 2 is a vertical sectional view of a portion of the cylinder and piston and of the piston ring;

Figure 3 is a horizontal enlarged section through the piston and piston ring;

Figure 4 is an inside face view of the spring 17;

Figure 5 is an inside face view of the piston ring.

Referring to these drawings, 10 designates a piston and A the cylinder in which the piston operates. The piston 10 is constructed in the usual manner, except that its skirt is formed adjacent the outer end of the piston with a piston ring groove, designated generally 11, and the inside face of the piston is thickened by means of a rib 12 coextensive with the groove 11 so that the wall of the piston ring will not be weakened at this point. The middle of the piston ring groove 11 is formed to provide an outwardly extending rib 13 which is less in depth than the full depth of the groove 11. The rib 12 at a plurality of points is formed with a plurality of pairs of passages 15 and with a single screw-threaded bore 16 disposed between each pair of passages 15.

Disposed upon the inside face of the piston 10 and, therefore, upon the inside face of the rib 12 are a plurality of spring leaves 17, each spring leaf being curved somewhat to conform to the curvature of the piston and being formed at its ends with the inwardly projecting, relatively shallow flanges 18 which engage around the ends of the pins 22 and prevent the spring from slipping off of the pins 22. Through the screw-threaded aperture 16 extends an adjusting screw 19 having a head 20 which bears against the outer face of the spring and a many-sided shank 21 whereby a wrench may be applied to the screw to adjust it. Disposed loosely in the passages 15 are the outwardly extending pins 22 against which the ends of the springs bear, these pins extending through the passages 15 and bearing against the piston ring.

The piston ring 23 may be made in any number of sections. I have illustrated it as being made in two sections, but the piston ring may be made in one piece and split if desired. The inner face of this piston ring is formed with a longitudinally extending groove 24 adapted to embrace the rib 13, the two side walls 25 of this groove 24 fitting into the grooves defined on each side of the rib 13. The exterior face of the ring is also formed with a relatively shallow groove 26 so as to provide two bearing surfaces 27 which wipe against the surface of cylinder A. If the ring is formed in two sections, one of the sections is formed at one end with a longitudinally extending, medially disposed tongue 28 and the other section with a longitudinally extending, medially disposed recess 29 in which the tongue is engaged. If the ring is a split ring, the joints between the abutting ends of the ring are formed in this same manner.

In the use of this device, the ring is put in place within the groove 11 in the usual manner and then by turning the screws 19 through a wrench applied to the shanks 21, the ring may be evenly and uniformly urged outward and centered with relation to the axial center of the piston. This is not possible in the ordinary piston ring which tends to shift radially within the groove upon the up and down strokes of the piston and tends, therefore, to wear away the cylinder at one point more than at another. Inasmuch as the piston ring does not wear evenly throughout its entire extent and does not bear with an even pressure throughout its entire extent against the piston wall, it is obvious that leakage will occur after a short time. With my device, however, the piston ring is yieldingly urged out against the surface of the cylinder by the spring 17 acting through the pins 22 and thus all of the pins may be evenly projected to the same extent and may be adjusted from time to time to keep the rings in properly adjusted position. I do not wish to be limited to any particular number of these springs with their accompanying pairs of pins, nor to the details of construction illustrated.

With regard to the particular construction of the piston ring, it is obvious that in order for gas or oil to pass the piston ring between the piston ring and the cylinder, it must pass one of the relatively narrow faces 27, then pass the groove 26 and pass the other relatively narrow face. It will be seen that these two narrow faces 27 do not have the same frictional engagement with the inner surface of the cylinder as the ring would have if the groove 26 were not provided. The face 27 in that case would be the full width of the ring and too much friction would be engendered. If the gas or lubricating oil attempts to pass the ring between the ring and the piston, it must pass inward between the ring and the wall of the groove 11 and then it must also pass the relatively shallow rib 13 and again pass between the side wall of the ring and the side wall of the groove 11. The piston ring is usually mounted for slight play within the piston ring groove longitudinally of the piston and as a consequence there is only one wall of the piston ring which bears tightly against the wall of the piston ring groove, which wall this is depending upon the direction of movement of the piston. With my construction there are always two faces of the piston ring which are in engagement with two faces of the piston ring groove.

I claim:—

1. A piston having a piston ring groove, a piston ring therein, means for adjustably urging the piston ring outward at a plurality of points comprising pins passing loosely through the piston to the interior thereof and bearing at their outer ends against the piston ring, springs upon the inner face of the piston bearing against said pins, and adjustable means for controlling the tension of said springs.

2. A piston having a piston ring groove, a piston ring therein, means for adjustably urging the piston ring outward at a plurality of points comprising pins passing loosely through the piston to the interior thereof and bearing at their outer ends against the piston ring, springs upon the inner face of the piston bearing against said pins, and an adjusting screw passing through each spring and into the wall of the cylinder whereby to adjust the tension of the spring.

3. A piston having a piston ring groove formed with an outwardly projecting, medially disposed, relatively shallow groove, the inner face of the piston immediately behind the piston ring groove being formed with an inwardly projecting rib, a piston ring disposed in said groove and formed upon its inner face to provide a groove to receive the medially disposed rib and embrace the same, a plurality of springs upon the inner face of the inner rib, a pair of pins passing through the wall of the piston and extending through the middle rib of the piston ring groove and freely slidable through the wall of the piston, the inner ends of said pins bearing against the inner faces of the springs, and a screw associated with each spring and engaging the piston whereby the middle portions of the spring may be forced toward or drawn away from the inner face of the piston to thereby adjust the pressure on the piston ring.

In testimony whereof I hereunto affix my signature.

JOHN W. KERNS.